Jan. 20, 1925.  1,523,913
S. SYMINGTON
COMPRESSED AIR BRAKE FOR TROLLEY CARS, RAILWAY
CARS, TRAINS, AND OTHER VEHICLES
Filed July 5, 1924
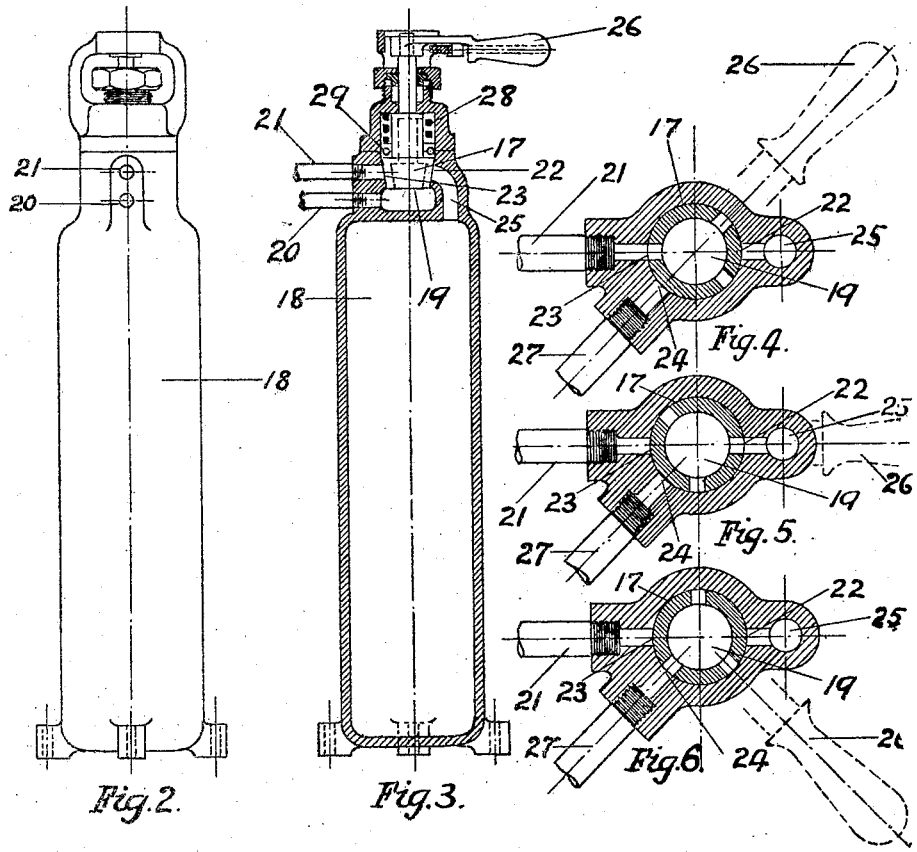
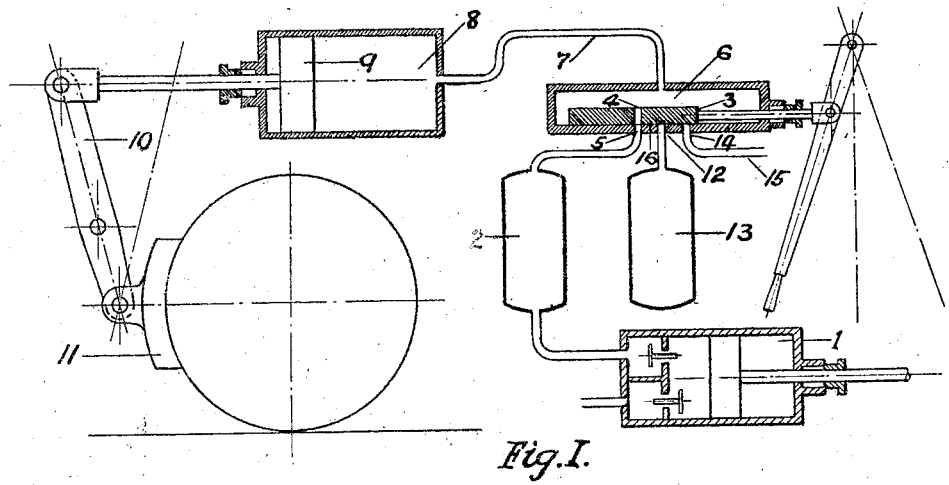
Inventor.
Scott Symington.

Patented Jan. 20, 1925.

1,523,913

UNITED STATES PATENT OFFICE.

SCOTT SYMINGTON, OF STROUDSBURG, PENNSYLVANIA.

COMPRESSED-AIR BRAKE FOR TROLLEY CARS, RAILWAY CARS, TRAINS, AND OTHER VEHICLES.

Application filed July 5, 1924. Serial No. 724,423.

*To all whom it may concern:*

Be it known that I, SCOTT SYMINGTON, a subject of the King of England, residing at 515 Thomas Street, Stroudsburg, in the county of Monroe and State of Pennsylvania, have invented a new and useful Improvement in Connection with Compressed-Air Brakes for Trolley Cars, Railway Cars, Trains, and Other Vehicles.

The objects of the improvement are twofold. (1) the attainment of economy in the consumption of air and power (2) the provision of means whereby the brakes may be applied gradually with greater facility than by methods of operation used hitherto.

The general method of operation of air brakes in use hitherto is as follows:—
Atmospheric air is pumped into a receiving or storage chamber by an air compressor to a pressure of approximately 80 pounds per square inch.

When an application of the brakes is desired, a quantity of this compressed air is admitted into a cylinder containing a piston by means of a valve. Motion is thus imparted to the piston which is transmitted to the brake-shoes or brake-bands by a system of rods or rods and chains and multiplying levers.

The brakes are released by allowing the air in the cylinder containing the moveable piston to escape to the atmosphere, the return of the piston to the off position being accomplished by means of springs.

My invention is designed to effect economy by saving a portion of the air under compression ordinarily exhausted to atmosphere by providing one or more auxiliary storage chambers into which the used compressed air is expanded in successive order until it reaches a pressure at which no further practical economy can be obtained and the balance is allowed to escape to the atmosphere. The compressed air thus stored is used in successive applications of the brakes.

When a series of reservoirs is used, the pressure in the first reservoir will always be higher than that in the second, and that in the second higher than that in the third and so on throughout the series.

In practice probably not more than two auxiliary reservoirs would be used with advantage.

In the drawing forming part of this specification, Figure 1 is a diagrammatic plan illustrative of a complete air brake system with my invention incorporated.

Figure 2 is an elevation of a combination motorman's operating valve and auxiliary reservoir.

Figure 3 is vertical section of this combined operating valve and reservoir.

Figure 4 is an enlarged horizontal section through the valve showing all the ports and in the position in which air passes from the main reservoir to the brake cylinder.

Figure 5 is an enlarged horizontal section through the valve in the position in which air passes from the brake cylinder to the auxiliary reservoir or vice versa.

Figure 6 is an enlarged horizontal section through the valve in the position in which air passes from the brake cylinder to the atmosphere.

The method of operation is illustrated in diagrammatic form in Fig. 1.

For the purpose of illustration the diagram shows a very simple form of brake transmission but the invention is equally applicable to brake systems with multiple lever and rod systems.

It also shows only one auxiliary reservoir. Additional reservoirs can readily be added each reservoir requiring its own outlet and inlet port or valve.

A valve of the slide type is indicated for ease in illustration but the invention is not confined to any particular type of valve.

Valves of the piston or rotating types may be used or if expedient a series of tappet valves could be arranged.

It is the belief of the inventor that a valve in the form of a multiple way plug cock will be the cheapest and most suitable.

Referring to Fig. 1 the operation is as follows:—

Air is compressed by the compressor 1 into the storage chamber 2.

In making an application of the brakes the valve 3 is moved till the port 4 is opposite the port 5 and a quantity of compressed air from the chamber 2 is admitted to the valve chamber 6, passes along the pipe 7 to the cylinder 8 and pushes the piston 9, the motion of which is transmitted by brake rigging 10 to the friction shoe 11.

When sufficient air has been admitted to stop or retard the motion of the vehicle as desired, the valve 3 is moved to a point in which the port 4 is midway between port 5 and port 12 and is closed. The air in cylinder 8 is held in compression. When it is desired to release the brakes the valve 3 is moved further in the same direction till port 4 is directly opposite port 12 and the air in the cylinder 8 is released and expanded into the auxiliary reservoir 13 until the pressure in both is equal and a point of equilibrium is reached. The motion of the valve 3 is further continued till the port 4 is opposite port 14 and the balance of the air in the brake cylinder 8 is released to atmosphere through the pipe 15 and the brakes are thus fully released. The air under compression in auxiliary reservoir 13 is stored by the closing of the port 12. On the next application of the brakes the action is reversed. When the port 4 is again brought opposite port 12, the compressed air in reservoir 13 re-expands into cylinder 8 causing a partial or low pressure application of the brakes. Full application is then made if desired by further motion of valve 3, allowing direct communication between the reservoir 2 and the cylinder 8. This ends one complete cycle of operations.

It is obvious that the pressure in auxiliary reservoir 13 will build up with each successive release of the brakes until a maximum point is reached. This maximum can never reach the maximum pressure in the storage reservoir 2. It may be found expedient to limit the pressure in auxiliary reservoir 13, which result may be readily attained by a pressure relief valve. Multiple auxiliary receivers if added to the system must each be connected to aditional separate ports in the valve face 16.

A more practical design of the apparatus is shown on Figs. 2, 3, 4, 5, 6, this form consisting of a combination operating valve and auxiliary receiver but it is not the desire of the inventor to confine this application in any way to this type or combination. This design is merely given to show the practicability and simplicity of the invention. It is desired to point out that the systems of operation in use hitherto can very readily be changed to the system covered by this invention by substituting the apparatus shown on Figs. 2, 3, 4, 5, 6 for the present types of operators valves and some minor piping alterations.

The type shown in Figs. 2, 3, 4, 5, 6 makes use of a multiple way plug cock 17 with a vertical axis set vertically above one auxiliary reservoir which at the same time forms a stand or base for the plug cock type operating valve and is intended to be bolted to the operating platform of the vehicle. The design shown is provided with a spring 28 and a ball bearing 29 to assist the rotating operation.

In explanation of the design the central opening 19 of the valve 17 is directly connected to the brake cylinder by the pipe 20. The pipe 21 is connected to the primary source of compressed air. The pipe 27 leads to the atmosphere and the passage 25 leads to the auxiliary reservoir 18.

The ports in the valve seat and the valve 17 are each three in number and are distributed round the peripheries of the valve and seat. Two of these ports 22, 23 are shown on the vertical cross section, Fig. 3 and ports 22, 23, 24 are shown on the horizontal cross sections 4, 5, 6.

Port 22 is the auxiliary reservoir port. Port 23 is the primary air supply port and port 24 is the exhaust port. It will be seen that the rotation of the valve 17 by the operating handle 26 permits the connecting of the brake cylinder, through the central opening of the valve, in turn to the primary source of air supply, the auxiliary reservoir and the atmosphere. The operation of the valve is the same as the operation previously described for Fig. 1. It is desired to point out that a neutral or closed position must be provided between each open position.

I claim:

1. In apparatus for stopping the motion of moving vehicles, the combination of a means for providing a supply of compressed air, means for admitting compressed air as desired into a cylinder containing a piston, a cylinder containing a piston, means for transmitting pressure on the piston to friction surfaces arranged so as to stop the rotation of the wheels of the vehicle, means for allowing compressed air to pass from the cylinder to a storage reservoir; and from the storage reservoir to the cylinder as desired, a storage reservoir arranged to store part of the compressed air when allowed to escape from the cylinder and means for allowing compressed air to escape from the cylinder to the atmosphere as desired.

2. In apparatus for stopping the motion of moving vehicles, the combination of a means for providing a supply of compressed air, means for admitting compressed air as desired into a cylinder containing a piston, a cylinder containing a piston, means for transmitting pressure on the piston to friction surfaces arranged so as to stop the rotation of the wheels of the vehicle, means for allowing compressed air to pass from the cylinder to a storage reservoir and from the storage reservoir to the cylinder as desired, a storage reservoir arranged to store part of the compressed air when allowed to escape from the cylinder, means for limiting the pressure of the compressed air in the storage reservoir, and means for allowing compressed air to escape from the cylinder to the atmosphere as desired.

3. In apparatus for stopping the motion of moving vehicles, the combination of a means for providing a supply of compressed air, means for admitting compressed air as desired into cylinders each containing a piston, cylinders each containing a piston, means for transmitting pressure on the pistons to friction surfaces arranged so as to stop the rotation of the wheels of the vehicle, means for allowing compressed air to pass from the cylinders to a storage reservoir and from the storage reservoir to the cylinders as desired, a storage reservoir arranged to store part of the compressed air when allowed to escape from the cylinder, and means for allowing compressed air to escape from the cylinders to the atmosphere as desired.

4. In apparatus for stopping the motion of moving vehicles, the combination of a means for providing a supply of compressed air, means for admitting compressed air as desired into cylinders each containing a piston, cylinders each containing a piston, means for transmitting pressure on the pistons to friction surfaces arranged so as to stop the rotation of the wheels of the vehicle, means for allowing compressed air to pass from the cylinders to a storage reservoir and from the storage reservoir to the cylinders as desired, a storage reservoir arranged to store part of the compressed air when allowed to escape from the cylinders, means for limiting the pressure of the compressed air in the storage reservoir, and means for allowing compressed air to escape from the cylinders to the atmosphere as desired.

5. In apparatus for stopping the motion of moving vehicles, the combination of a means for providing a supply of compressed air, means for admitting compressed air as desired into a cylinder containing a piston, a cylinder containing a piston, means for transferring pressure on the piston to friction surfaces arranged so as to stop the rotation of the wheels of the vehicle, means for allowing compressed air to pass from the cylinder to a succession of storage reservoirs and from the succession of storage reservoirs to the cylinder as desired, a succession of storage reservoirs arranged to store part of the compressed air when allowed to escape from the cylinder, and means for allowing compressed air to escape from the cylinder to the atmosphere as desired.

6. In apparatus for stopping the motion of moving vehicles, the combination of a means for providing a supply of compressed air, means for admitting compressed air as desired into a cylinder containing a piston, a cylinder containing a piston, means for transferring pressure on the piston to friction surfaces arranged so as to stop the rotation of the wheels of the vehicle, means for allowing compressed air to pass from the cylinder to a succession of storage reservoirs and from the succession of storage reservoirs to the cylinder as desired, a succession of storage reservoirs arranged to store part of the compressed air when allowed to escape from the cylinder, means for limiting the pressure of the compressed air in the storage reservoirs, and means for allowing compressed air to escape from the cylinder to the atmosphere as desired.

7. In apparatus for stopping the motion of moving vehicles, the combination of a means for providing a supply of compressed air, means for admitting compressed air as desired into cylinders each containing a piston, cylinders each containing a piston, means for transmitting pressure on the pistons to friction surfaces arranged so as to stop the rotation of the wheels of the vehicle, means for allowing compressed air to pass from the cylinders to a succession of storage reservoirs and from the succession of storage reservoirs to the cylinders as desired, a succession of storage reservoirs arranged to store part of the compressed air when allowed to escape from the cylinders and means for allowing compressed air to escape from the cylinders to the atmosphere as desired.

8. In apparatus for stopping the motion of moving vehicles, the combination of a means for providing a supply of compressed air, means for admitting compressed air as desired into cylinders each containing a piston, cylinders each containing a piston, means for transmitting pressure on the pistons to friction surfaces arranged so as to stop the rotation of the wheels of the vehicle, means for allowing compressed air to pass from the cylinders to a succession of storage reservoirs and from the succession of storage reservoirs to the cylinders as desired, a succession of storage reservoirs arranged to store part of the compressed air when allowed to escape from the cylinders, means for limiting the pressure of the compressed air in the storage reservoirs, and means for allowing compressed air to escape from the cylinders to the atmosphere as desired.

SCOTT SYMINGTON